United States Patent
Kim et al.

(10) Patent No.: US 11,531,192 B2
(45) Date of Patent: Dec. 20, 2022

(54) OPTICAL IMAGING SYSTEM

(71) Applicant: SAMSUNG ELECTRO-MECHANICS CO., LTD., Suwon-si (KR)

(72) Inventors: Hag Chul Kim, Suwon-si (KR); Yong Joo Jo, Suwon-si (KR); Hwan Soo Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 71 days.

(21) Appl. No.: 17/074,895

(22) Filed: Oct. 20, 2020

(65) Prior Publication Data

US 2021/0033827 A1    Feb. 4, 2021

Related U.S. Application Data

(63) Continuation of application No. 16/108,506, filed on Aug. 22, 2018, now Pat. No. 10,845,575.

(30) Foreign Application Priority Data

Dec. 7, 2017  (KR) ......................... 10-2017-0167715

(51) Int. Cl.
```
G02B 13/18    (2006.01)
G02B 9/64     (2006.01)
G02B 13/00    (2006.01)
G02B 1/04     (2006.01)
G02B 1/00     (2006.01)
```
(52) U.S. Cl.
CPC ......... G02B 13/0045 (2013.01); G02B 1/007 (2013.01); G02B 1/041 (2013.01)

(58) Field of Classification Search
CPC ..... G02B 13/0045; G02B 1/007; G02B 1/041
USPC .......................................... 359/708, 751, 755
See application file for complete search history.

(56) References Cited

U.S. PATENT DOCUMENTS

| | | | |
|---|---|---|---|
| 10,564,395 B2 | 2/2020 | Jia et al. | |
| 2014/0139931 A1* | 5/2014 | Kubota ................... | G02B 9/62 359/740 |
| 2015/0022908 A1* | 1/2015 | Tomioka .................. | G02B 9/64 359/751 |

(Continued)

FOREIGN PATENT DOCUMENTS

| CN | 106199922 A | 12/2016 |
|---|---|---|
| CN | 106772946 A | 5/2017 |

(Continued)

OTHER PUBLICATIONS

Chinese Office Action dated Oct. 28, 2020 in counterpart Chinese Patent Application No. 201811496579.X (8 pages in English and 9 pages in Chinese).

(Continued)

*Primary Examiner* — William Choi
(74) *Attorney, Agent, or Firm* — NSIP Law

(57) ABSTRACT

An optical imaging system includes a first lens having negative refractive power, a second lens having negative refractive power, a third lens, a fourth lens, a fifth lens, a sixth lens, and a seventh lens. The first to seventh lenses are sequentially disposed from an object side toward an image side. The third lens, the fourth lens, the sixth lens, and the seventh lens are formed of plastic, and the first lens, the second lens, and the fifth lens are formed of glass.

20 Claims, 4 Drawing Sheets

(56) References Cited

U.S. PATENT DOCUMENTS

| | | | | |
|---|---|---|---|---|
| 2016/0085053 A1* | 3/2016 | Asami | ............... | G02B 13/0045 |
| | | | | 359/755 |
| 2017/0192200 A1 | 7/2017 | Hsieh et al. | | |
| 2017/0199355 A1 | 7/2017 | Kitahara et al. | | |
| 2018/0188493 A1* | 7/2018 | Huang | ............... | G02B 13/0045 |
| 2019/0187442 A1 | 6/2019 | Jia et al. | | |

FOREIGN PATENT DOCUMENTS

| | | |
|---|---|---|
| JP | 2016-194653 A | 11/2016 |
| JP | 2017-125887 A | 7/2017 |
| KR | 10-2011-0071807 A | 6/2011 |

OTHER PUBLICATIONS

Gross, Herbert et al., "Handbook of Optical Systems, vol. 3: Aberration Theory and Correction of Optical Systems", *Wiley*, 2007 (pp. 377-379).

* cited by examiner

OPTICAL IMAGING SYSTEM

CROSS-REFERENCE TO RELATED APPLICATIONS

This application is a continuation of U.S. patent application Ser. No. 16/108,506 filed on Aug. 22, 2018, now U.S. Pat. No. 10,845,575 issued on Nov. 24, 2020, which claims the benefit under 35 USC 119(a) of Korean Patent Application No. 1 0-201 7-01 6771 5 filed on Dec. 7, 2017, in the Korean Intellectual Property Office, the entire disclosures of which are incorporated herein by reference for all purposes.

BACKGROUND

1. Field

This application relates to an optical imaging system.

2. Description of the Background

In general, camera modules are mounted in mobile communications terminals, computers, vehicles, and the like, enabling the capturing of images.

In accordance with the trend for slimmer mobile communications terminals, such camera modules have been required to have a small size and high image quality.

Meanwhile, a camera module for a vehicle has also been required to have a small size and high image quality to not obstruct a driver's visual field and spoil a vehicle appearance.

Particularly, a camera used in a rearview mirror of a vehicle should be able to capture a clear image to secure a rear visual field during driving of the vehicle, and is thus required to have high image quality.

In addition, a camera used in a vehicle should be able to clearly capture an image of an object even at night when illumination is low, and thus requires a lens system that has a small size and which may capture an image in both of a visible wavelength region and a near infrared region.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having negative refractive power, a second lens having negative refractive power, a third lens, a fourth lens, a fifth lens, a sixth lens, and a seventh lens. The first to seventh lenses are sequentially disposed from an object side toward an image side, the third lens, the fourth lens, the sixth lens, and the seventh lens are formed of plastic, and the first lens, the second lens, and the fifth lens are formed of glass.

Object-side surfaces and image-side surfaces of the first lens and the second lens may be spherical surfaces, and object-side surfaces and image-side surfaces of the third lens, the fourth lens, the fifth lens, the sixth lens, and the seventh lens may be aspherical surfaces.

The third lens, the fourth lens, and the seventh lens may be formed of plastic having the same optical characteristics.

The sixth lens and the seventh lens may be disposed closer to each other than any other lenses to each other.

The sixth lens and the seventh lens may be formed of plastic having different optical characteristics from each other.

The optical imaging system may further include a stop disposed between the fourth lens and the fifth lens.

In the optical imaging system TTL is a distance from an object-side surface of the first lens to an imaging plane of an image sensor, IMGH is a half of a diagonal length of the imaging plane of the image sensor, and TTL/(2*IMGH) may be less than 3.0.

In the optical imaging system f3 is a focal length of the third lens, f is an overall focal length of the optical imaging system including the first lens to the seventh lens, and f/f3 may be greater than 0.02 and less than 0.65.

In the optical imaging system f4 is a focal length of the fourth lens and f/f4 may be greater than −0.5 and less than −0.1.

In the optical imaging system f6 is a focal length of the sixth lens and f/f6 may be greater than 0.25 and less than 0.65.

In the optical imaging system f7 is a focal length of the seventh lens and f/f7 may be greater than −0.5 and less than −0.1.

A refractive index of the third lens may be less than 1.64. A refractive index of the fourth lens may be less than 1.64. A refractive index of the sixth lens may be less than 1.535 and a refractive index of the seventh lens may be less than 1.64.

In another general aspect, an optical imaging system includes a first lens having negative refractive power and having a meniscus shape, of which an object-side surface is convex, a second lens having negative refractive power and having both surfaces concave, a third lens, a fourth lens, a fifth lens, a sixth lens, and a seventh lens. The first to seventh lenses are sequentially disposed from an object side toward an image side, the third lens, the fourth lens, the sixth lens, and the seventh lens are formed of plastic, and the first lens, the second lens, and the fifth lens are formed of glass. A distance between the sixth lens and the seventh lens is shorter than between any other lenses, and the sixth lens and the seventh lens are formed of plastic having different optical characteristics from each other.

The third lens, the fourth lens, and the seventh lens may be formed of plastic having the same optical characteristics. The third lens may have a positive refractive power, the fourth lens may have a negative refractive power, and the seventh lens may have a negative refractive power.

Both surfaces of the third lens may be convex and both surfaces of the fourth lens may be concave.

An object-side surface and an image-side surface of the first lens may be spherical surfaces.

An object-side surface and an image-side surface of the second lens may be spherical surfaces, and object-side surfaces and image-side surfaces of the third lens and the fifth lens may be aspherical surfaces.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
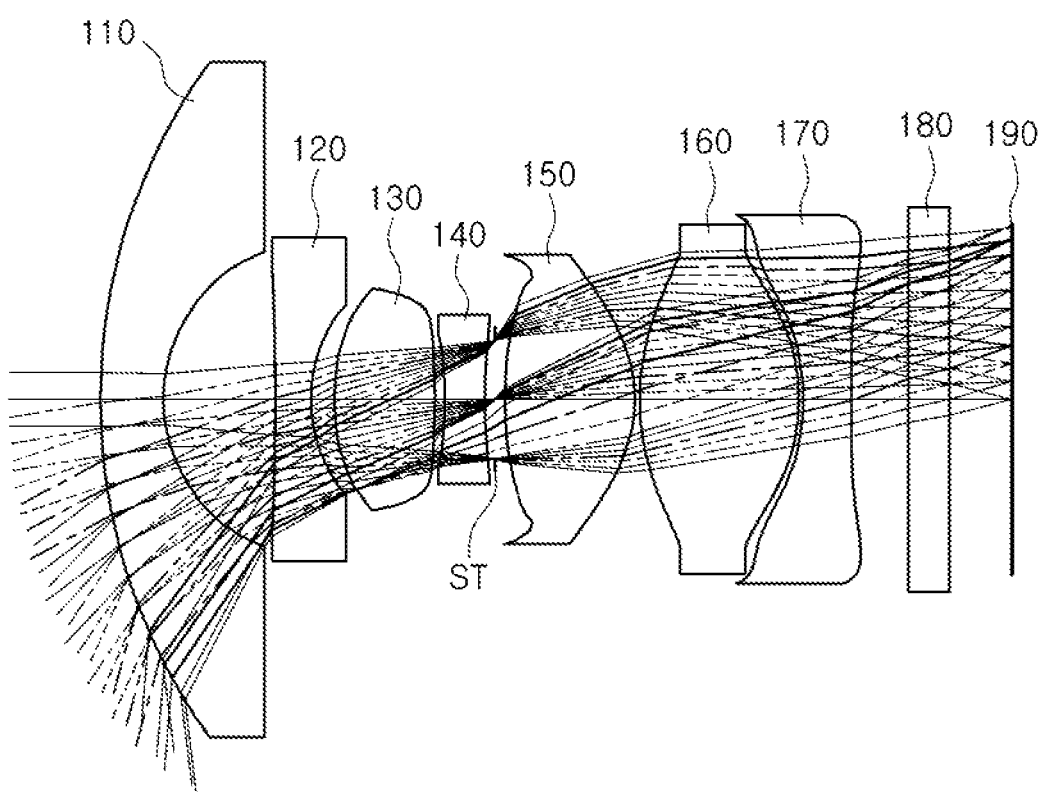
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

In this application, a first lens refers to a lens closest to an object, while a seventh lens refers to a lens closest to an image sensor.

In addition, a first surface of each lens refers to a surface thereof closest to an object side (or an object-side surface) and a second surface of each lens refers to a surface thereof closest to an image side (or an image-side surface). Further, all numerical values of radii of curvature and thicknesses of lenses, image heights (ImgH, a half of a diagonal length of an imaging plane of the image sensor), and the like, are indicated by millimeters (mm), and a field of view (FOV) of an optical imaging system is indicated by degrees.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a very narrow region in the vicinity of an optical axis.

An aspect of the present disclosure provides an optical imaging system in which an aberration improvement effect may be increased, a high level of resolution may be implemented, imaging may be performed even in an environment in which illumination is low, and a deviation in resolution may be suppressed even over a wide change in temperature.

An optical system in the examples described herein may include seven lenses.

For example, the optical imaging system may include a first lens, a second lens, a third lens, a fourth lens, a fifth lens, a sixth lens, and a seventh lens sequentially disposed from the object side.

However, the optical system is not limited to only including the seven lenses, but may further include other components, if necessary.

For example, the optical imaging system may further include an image sensor configured to convert an image of a subject incident on the image sensor into an electrical signal. The image sensor may be configured to capture an image of an object in a near infrared region as well as a visible light region.

In addition, the optical imaging system may further include a stop configured to control an amount of light. For example, the stop may be disposed between the fourth and fifth lenses.

In the optical imaging system in the examples described herein, some of the first to seventh lenses may be formed of plastic, and the others thereof may be formed of glass. In addition, the lenses formed of glass may have optical characteristics different from those of the lenses formed of plastic.

For example, the first lens, the second lens, and the fifth lens may be formed of glass, and the third lens, the fourth lens, the sixth lens, and the seventh lens may be formed of plastic.

In addition, in the optical imaging system in the examples described herein, some of the first to seventh lenses may be aspherical lenses, and the others thereof may be spherical lenses.

As an example, first surfaces and second surfaces of each of the first lens and the second lens may be spherical surfaces. First and second surfaces of the third lens to the seventh lens may be aspherical surfaces.

That is, the first lens and the second lens may be formed of glass and have first surfaces and second surfaces which are spherical surfaces, and the fifth lens may be formed of glass and may have a first surface and a second surface which are aspherical surfaces.

In addition, the third lens, the fourth lens, the sixth lens, and the seventh lens may be formed of plastic and may have first surfaces and second surfaces which are aspherical surfaces.

An aspherical surface of each of the lenses may be represented by the following Equation 1:

$$Z = \frac{cY^2}{1+\sqrt{1-(1+K)c^2Y^2}} + AY^4 + BY^6 + CY^8 + DY^{10} + \ldots \quad (1)$$

In Equation 1, c is a curvature (an inverse of a radius of curvature) of a lens, K is a conic constant, and Y is a distance from a certain point on an aspherical surface of the lens to an optical axis in a direction perpendicular to the optical axis. In addition, constants A to D are aspherical coefficients.

In addition, Z is a distance between the certain point on the aspherical surface of the lens at the distance Y and a tangential plane meeting the apex of the aspherical surface of the lens.

The optical imaging system including the first to seventh lenses may have negative refractive power/negative refractive power/positive refractive power/negative refractive power/positive refractive power/positive refractive power/negative refractive power sequentially from the object side.

The optical imaging system in the examples described herein may satisfy the following Conditional Expressions 2 through 10:

$$TTL/(2*IMGH)<3.0 \quad (2)$$

$$0.25<f/f3<0.65 \quad (3)$$

$$-0.5<f/f4<-0.1 \quad (4)$$

$$0.25<f/f6<0.65 \quad (5)$$

$$-0.5<f/f7<-0.1 \quad (6)$$

$$n3<1.64 \quad (7)$$

$$n4<1.64 \quad (8)$$

$$n6<1.535 \quad (9)$$

$$n7<1.64 \quad (10)$$

In the above Conditional Expressions 2 through 10, TTL is a distance from an object-side surface of the first lens to the imaging plane of the image sensor, IMGH is a half of a diagonal length of the imaging plane of the image sensor, f is an overall focal length of the optical imaging system, f3 is a focal length of the third lens, f4 is a focal length of the fourth lens, f6 is a focal length of the sixth lens, f7 is a focal length of the seventh lens, n3 is a refractive index of the third lens, n4 is a refractive index of the fourth lens, n6 is a refractive index of the sixth lens, and n7 is a refractive index of the seventh lens.

In the optical imaging system in some examples described herein, a plurality of lenses may perform an aberration correction function to thus increase aberration improvement performance.

In addition, the optical imaging system may have an f-number (Fno) (a constant indicating brightness of the optical imaging system) of 2.1 or less to thus clearly capture an image of an object even in an environment in which illumination is low.

In addition, the optical imaging system may clearly capture the image of the object in both of a visible light region and a near infrared region.

Further, in the optical imaging system in some of the examples described herein, the first lens, the second lens, the fourth lens, and the fifth lens may be configured as spherical lenses to thus reduce costs for manufacturing the optical imaging system.

In addition, in the optical imaging system in some of the examples described herein, since the first lens, the second lens, and the fifth lens are formed of glass having a relatively small coefficient of thermal expansion and the third lens, the fourth lens, the sixth lens, and the seventh lens are formed of plastic, a constant resolution may be maintained even over a temperature range of about −40 to about 80° C. Therefore, the optical imaging system in some of the examples described herein may implement a high level of resolution even in an environment in which a temperature changes over a wide range.

A housing in which the first lens to the seventh lens are disposed may be formed of plastic, and the housing may shrink or expand according to a change in temperature of the surrounding environment. Therefore, a distance between the seventh lens and the image sensor may be changed by the deformation of the housing according to the change in temperature, which may result in a problem that a focus does not converge properly.

However, in the optical imaging system in some of the examples described herein, since the third lens, the fourth lens, the sixth lens, and the seventh lens are formed of plastic, the third lens, the fourth lens, the sixth lens, and the seventh lens may shrink or expand according to the change in temperature of the surrounding environment.

Therefore, by designing an amount of deformation of the third lens, the fourth lens, the sixth lens, and the seventh lens in consideration of an amount of shape deformation of the housing according to the change in temperature, a focus position may not be changed even in a case in which the temperature is changed.

That is, the optical imaging system in some of the examples described herein may be configured so that a variation of the distance between the seventh lens and the image sensor according to the change in temperature corresponds to a variation of the focus position according to the change in temperature.

An optical imaging system according to a first example disclosed herein will be described with reference to FIGS. 1 and 2.

The optical imaging system according to the first example may include an optical system including a first lens 110, a second lens 120, a third lens 130, a fourth lens 140, a fifth lens 150, a sixth lens 160, and a seventh lens 170, and may further include a stop ST, an optical filter 180, and an image sensor 190.

Lens characteristics (radii of curvature, thicknesses of lenses or distances between the lenses, refractive indices, and Abbe numbers) of each lens are shown in Table 1.

Meanwhile, the image height may be about 3.3 mm to about 3.4 mm.

TABLE 1

| Surface No. | | Radius of Curvature | Thickness or Distance | Refractive Index | Abbe Number |
|---|---|---|---|---|---|
| \multicolumn{6}{c}{f = 2.2, Fno = 2.07, FOV = 188°} |
| Object | | Infinity | Infinity | | |
| 1 | First Lens | 11.4930 | 1.2600 | 1.7725 | 49.6 |
| 2 | | 3.1700 | 2.2251 | | |
| 3 | Second Lens | −55.8621 | 0.7000 | 1.6204 | 60.3 |
| 4 | | 2.9010 | 0.4724 | | |

TABLE 1-continued f = 2.2, Fno = 2.07, FOV = 188°

| Surface No. | | Radius of Curvature | Thickness or Distance | Refractive Index | Abbe Number |
|---|---|---|---|---|---|
| 5 | Third Lens | 4.4159 | 2.0000 | 1.632 | 23.0 |
| 6* | | −8.5489 | 0.2000 | | |
| 7* | Fourth Lens | −8.5000 | 0.8000 | 1.632 | 23.0 |
| 8* | | 10.3259 | 0.2000 | | |
| 9 | Stop | Infinity | 0.2000 | | |
| 10* | Fifth Lens | 9.4642 | 2.6000 | 1.4971 | 81.5 |
| 11* | | −2.9190 | 0.1100 | | |
| 12* | Sixth Lens | 4.9209 | 3.1536 | 1.5311 | 55.7 |
| 13* | | −4.9271 | 0.1000 | | |
| 14* | Seventh Lens | −4.2500 | 0.9500 | 1.632 | 23.0 |
| 15* | | −27.4167 | 1.1415 | | |
| 16 | Optical Filter | Infinity | 0.8000 | 1.5167 | 64.1 |
| 17 | | Infinity | 1.2769 | | |
| 18 | Imaging Plane | Infinity | −0.0100 | | |

In surface numbers of Table 1, the notation * indicates an aspherical surface.

In the first example, the first lens 110 may have negative refractive power, and have a meniscus shape, of which an object-side surface is convex. For example, a first surface of the first lens 110 may be convex in the paraxial region, and a second surface thereof may be concave in the paraxial region.

The second lens 120 may have negative refractive power, and both surfaces thereof may be concave. For example, first and second surfaces of the second lens 120 may be concave in the paraxial region.

The third lens 130 may have positive refractive power, and both surfaces thereof may be convex. For example, first and second surfaces of the third lens 130 may be convex in the paraxial region.

The fourth lens 140 may have negative refractive power, and both surfaces thereof may be concave. For example, first and second surfaces of the fourth lens 140 may be concave in the paraxial region.

The fifth lens 150 may have positive refractive power, and both surfaces thereof may be convex. For example, first and second surfaces of the fifth lens 150 may be convex in the paraxial region.

The sixth lens 160 may have positive refractive power, and both surfaces thereof may be convex. For example, first and second surfaces of the sixth lens 160 may be convex in the paraxial region.

The seventh lens 170 may have negative refractive power, and have a meniscus shape of which an image-side surface is convex. For example, a first surface of the seventh lens 170 may be concave in the paraxial region, and a second surface thereof may be convex in the paraxial region.

Meanwhile, the first and second surfaces of the third lens 130 to the seventh lens 170 may have aspherical coefficients as illustrated in Table 2.

In addition, the first lens 110 and the second lens 120 may be spherical lenses and may be formed of glass. The fifth lens 150 may be an aspherical lens and may be formed of glass. The third lens 130, the fourth lens 140, the sixth lens 160, and the seventh lens 170 may be aspherical lenses and may be formed of plastic.

In addition, the third lens 130, the fourth lens 140, the sixth lens 160, and the seventh lens 170 may be formed of plastic having the same optical characteristics.

Meanwhile, the sixth lens 160 and the seventh lens 170 may be disposed to be close to each other. For example, among the distances between the respective lenses, a distance between the sixth lens 160 and the seventh lens 170 may be the shortest. In addition, the sixth lens 160 and the seventh lens 170 may be formed of plastic having different optical characteristics.

The sixth lens 160 and the seventh lens 170 formed of plastic having different optical characteristics may be disposed to be closer to each other than any other lenses to each other to improve chromatic aberration correction performance.

In addition, the stop ST may be disposed between the fourth lens 140 and the fifth lens 150.

Figure 2:
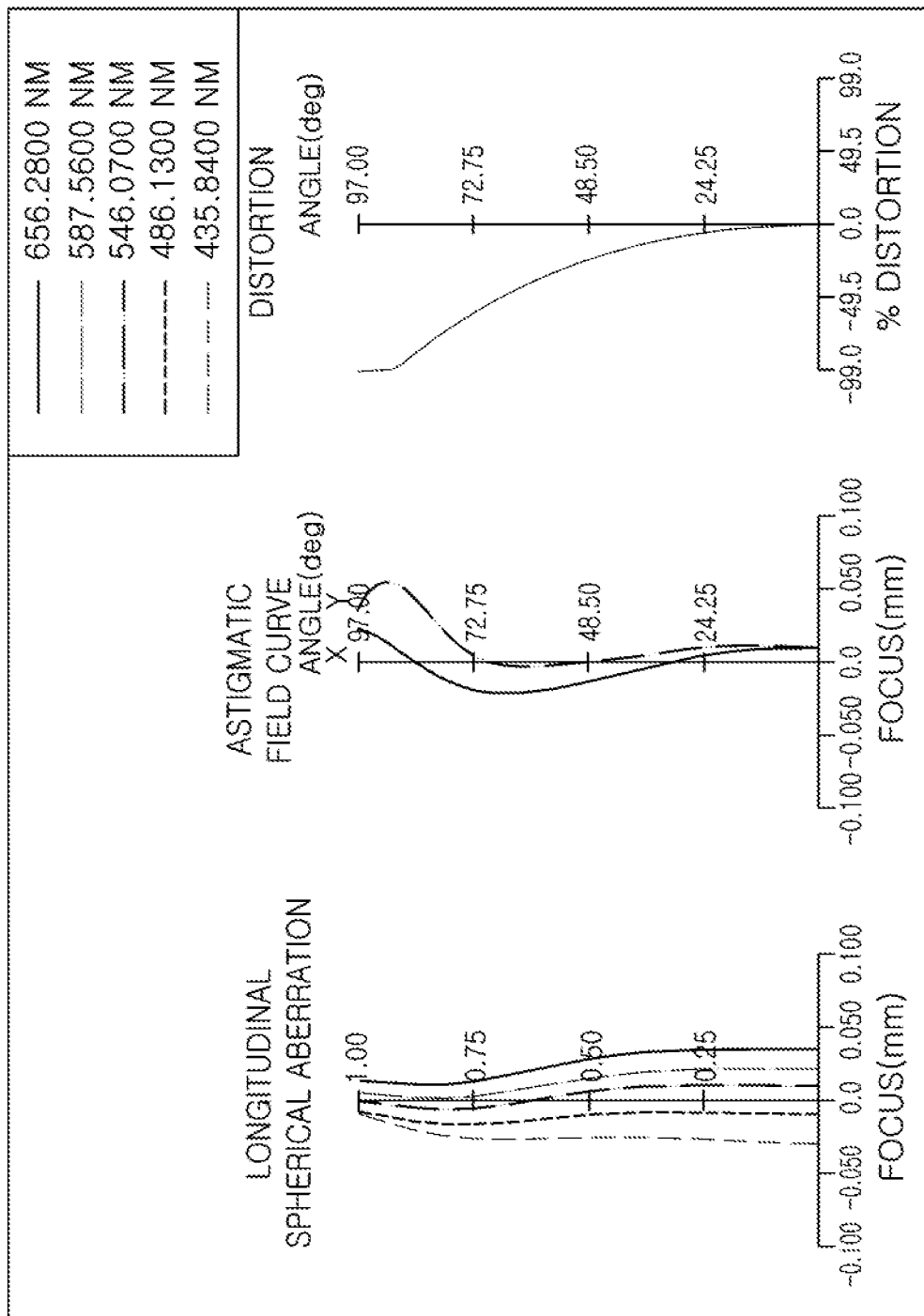
FIG. 2 illustrates examples of curves representing aberration characteristics of the optical imaging system illustrated in FIG. 1.

In addition, the optical imaging system configured as described above may have aberration characteristics illustrated in FIG. 2.

Figure 3:
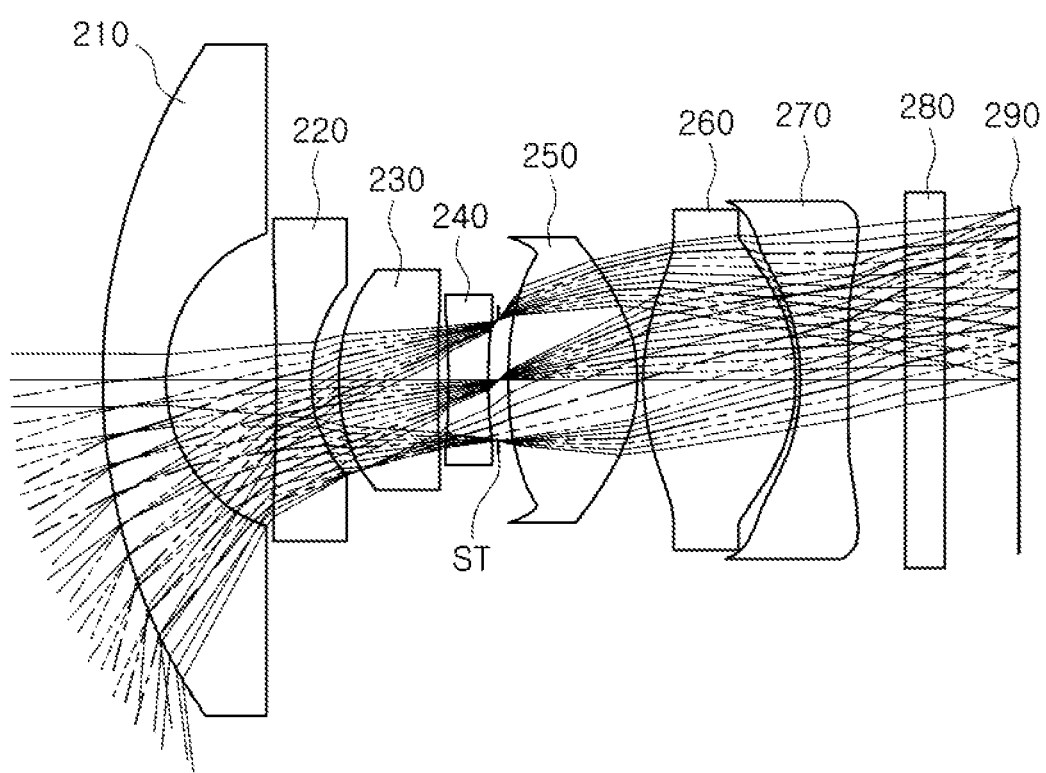
FIG. 3 is a view illustrating a second example of an optical system.

An optical imaging system according to a second example disclosed herein will be described with reference to FIGS. 3 and 4.

The optical imaging system according to the second example may include an optical system including a first lens 210, a second lens 220, a third lens 230, a fourth lens 240, a fifth lens 250, a sixth lens 260, and a seventh lens 270, and may further include a stop ST, an optical filter 280, and an image sensor 290.

Lens characteristics (radii of curvature, thicknesses of lenses or distances between the lenses, refractive indices, and Abbe's numbers) of each lens are shown in Table 3.

TABLE 2

| | 5 | 6 | 7 | 8 | 10 | 11 | 12 | 13 | 14 | 15 |
|---|---|---|---|---|---|---|---|---|---|---|
| K | 0.440136 | 6.848888 | 6.135658 | 1.33456 | 15 | −2.49737 | −4.74098 | 0.30031 | 0.763848 | 18.52056 |
| A | 0.005715 | 0.02412 | 0.010521 | 0.002348 | 0.006184 | −0.00795 | 0.003907 | −0.02091 | −0.00098 | 0.017304 |
| B | −3.23E−05 | −0.00466 | −0.00776 | −0.00388 | −0.00117 | 0.000652 | −0.00026 | 0.004831 | 0.000503 | −0.00311 |
| C | 0.000163 | 0.000627 | 0.000145 | 0.001091 | 0 | 0 | −5.16E−06 | −0.00049 | 1.71E−06 | 0.000286 |
| D | −2.86E−05 | −0.00046 | −0.00032 | −0.00022 | 0 | 0 | 1.85E−07 | 2.37E−05 | 5.83E−06 | −1.10E−05 |

Meanwhile, the image height may be about 3.3 mm to about 3.4 mm.

TABLE 3 f = 2.2, Fno = 2.06, FOV = 188°

| Surface No. | | Radius of Curvature | Thickness or Distance | Refractive Index | Abbe Number |
|---|---|---|---|---|---|
| Object | | Infinity | Infinity | | |
| 1 | First Lens | 12.0632 | 1.2600 | 1.7725 | 49.6 |
| 2 | | 3.1700 | 2.2102 | | |
| 3 | Second Lens | −73.9693 | 0.7000 | 1.6204 | 60.3 |
| 4 | | 2.9163 | 0.5551 | | |
| 5 | Third Lens | 4.3464 | 2.0000 | 1.632 | 23.0 |
| 6* | | −32.2432 | 0.2000 | | |
| 7* | Fourth Lens | −21.4317 | 0.8000 | 1.632 | 23.0 |
| 8* | | 11.6389 | 0.2008 | | |
| 9 | Stop | Infinity | 0.2000 | | |
| 10* | Fifth Lens | 9.8550 | 2.6000 | 1.4971 | 81.5 |
| 11* | | −3.1499 | 0.1100 | | |
| 12* | Sixth Lens | 4.7210 | 3.0489 | 1.5311 | 55.7 |
| 13* | | −4.6500 | 0.1000 | | |
| 14* | Seventh Lens | −4.2500 | 0.9500 | 1.632 | 23.0 |
| 15* | | −32.2039 | 1.1415 | | |
| 16 | Optical Filter | Infinity | 0.8000 | 1.5167 | 64.1 |
| 17 | | Infinity | 1.4878 | | |
| 18 | Imaging Plane | Infinity | −0.0100 | | |

In surface numbers of Table 3, the notation * indicates an aspherical surface.

Meanwhile, the first and second surfaces of the third lens 230 to the seventh lens 270 may have aspherical coefficients as illustrated in Table 4.

TABLE 4

| | 5 | 6 | 7 | 8 | 10 | 11 | 12 | 13 | 14 | 15 |
|---|---|---|---|---|---|---|---|---|---|---|
| K | 0.157622 | 0 | 0 | 0 | 15 | −1.44397 | −4.84012 | 0.225957 | 0.905192 | 61.64189 |
| A | 0.006202 | 0.0127 | −0.00517 | 0.000124 | 0.009688 | −0.00285 | 0.003132 | −0.01954 | 0.00075 | 0.018517 |
| B | −0.00026 | 0.000346 | 0 | 0 | −0.00138 | 0.000269 | −0.00027 | 0.004597 | 0.00019 | −0.00326 |
| C | 0.000211 | 0 | 0 | 0 | 0 | 0 | −2.13E−05 | −0.00049 | 3.60E−35 | 0.000293 |
| D | −378E−05 | 0 | 0 | 0 | 0 | 0 | −9.81E−07 | 2.33E−05 | 5.70E−06 | −1.15E−05 |

In the second example, the first lens 210 may have negative refractive power, and have a meniscus shape, of which an object-side surface is convex. For example, a first surface of the first lens 210 may be convex in the paraxial region, and a second surface thereof may be concave in the paraxial region.

The second lens 220 may have negative refractive power, and both surfaces thereof may be concave. For example, first and second surfaces of the second lens 220 may be concave in the paraxial region.

The third lens 230 may have positive refractive power, and both surfaces thereof may be convex. For example, first and second surfaces of the third lens 230 may be convex in the paraxial region.

The fourth lens 240 may have negative refractive power, and both surfaces thereof may be concave. For example, first and second surfaces of the fourth lens 240 may be concave in the paraxial region.

The fifth lens 250 may have positive refractive power, and both surfaces thereof may be convex. For example, first and second surfaces of the fifth lens 250 may be convex in the paraxial region.

The sixth lens 260 may have positive refractive power, and both surfaces thereof may be convex. For example, first and second surfaces of the sixth lens 260 may be convex in the paraxial region.

The seventh lens 270 may have negative refractive power, and have a meniscus shape of which an image-side surface is convex. For example, a first surface of the seventh lens 270 may be concave in the paraxial region, and a second surface thereof may be convex in the paraxial region.

In addition, the first lens 210 and the second lens 220 may be spherical lenses and may be formed of glass. The fifth lens 250 may be an aspherical lens and may be formed of glass. The third lens 230, the fourth lens 240, the sixth lens 260, and the seventh lens 270 may be aspherical lenses and may be formed of plastic.

In addition, the third lens 230, the fourth lens 240, the sixth lens 160, and the seventh lens 270 may be formed of plastic having the same optical characteristics.

Meanwhile, the sixth lens and the seventh lens 270 may be disposed so as to be close to each other. For example, among the distances between the respective lenses, a distance between the sixth lens 260 and the seventh lens 270 may be the shortest. In addition, the sixth lens 260 and the seventh lens 270 may be formed of plastic having different optical characteristics.

The sixth lens 260 and the seventh lens 270 formed of plastic having different optical characteristics may be disposed to be closer to each other than any other lenses to each other to thus improve chromatic aberration correction performance.

In addition, the stop ST may be disposed between the fourth lens 240 and the fifth lens 250.

Figure 4:
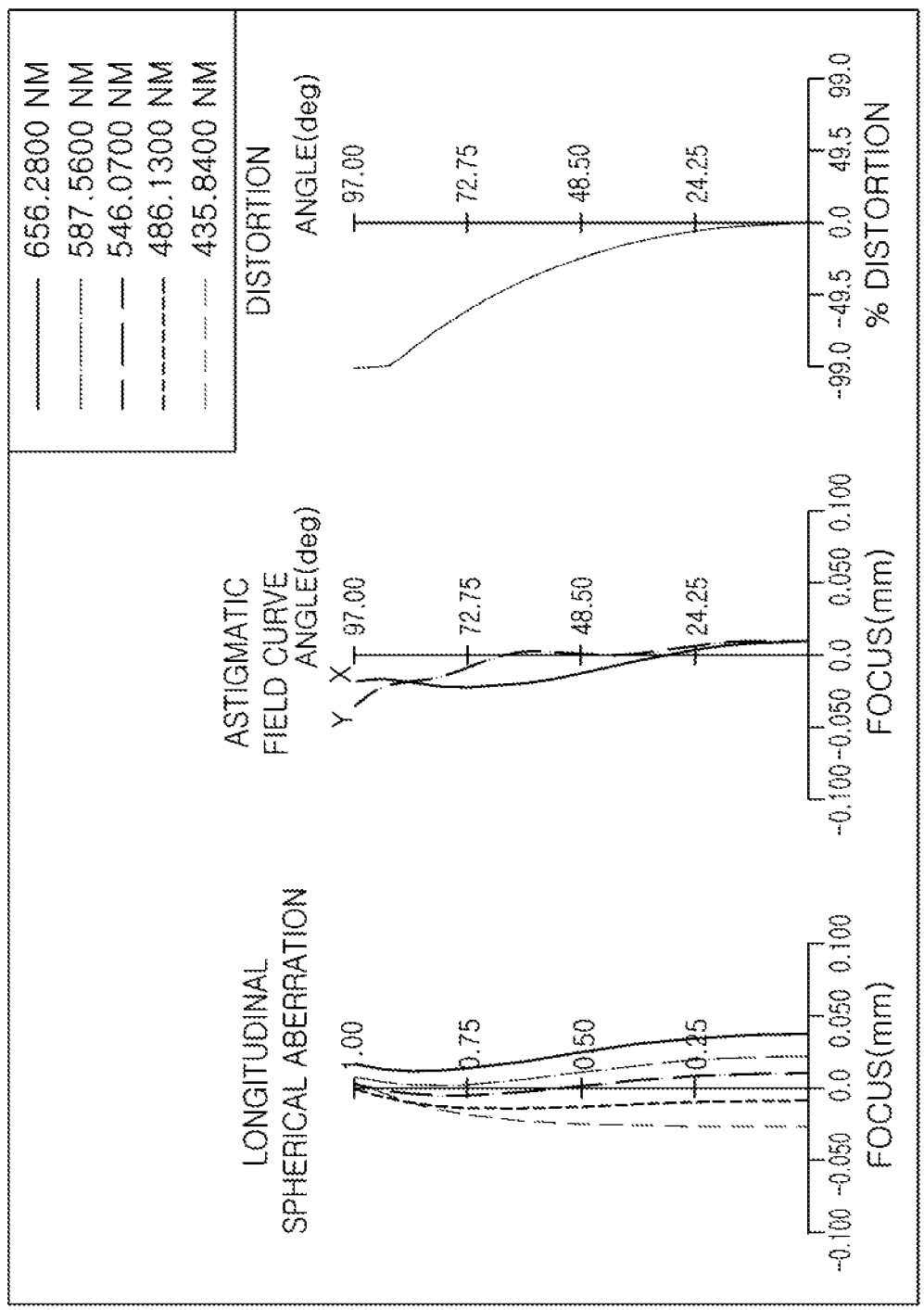
FIG. 4 illustrates examples of curves representing aberration characteristics of the optical imaging system illustrated in FIG. 3.

In addition, the optical imaging system configured as described above may have aberration characteristics illustrated in FIG. 4.

As set forth above, in the optical imaging systems in the examples disclosed herein, an aberration improvement effect may be increased, a high level of resolution may be implemented, imaging may be performed even in an environment in which illumination is low, and a deviation in resolution may be suppressed even over a wide change in temperature.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising negative refractive power;
a second lens comprising refractive power;
a third lens comprising positive refractive power;
a fourth lens comprising negative refractive power;
a fifth lens comprising refractive power;
a sixth lens comprising positive refractive power; and
a seventh lens comprising negative refractive power,
wherein the first to seventh lenses are sequentially disposed from an object side toward an image side,
wherein $TTL/(2*IMGH)<3.0$ is satisfied, where TTL is a distance from an object-side surface of the first lens to an imaging plane of an image sensor, and IMGH is a half of a diagonal length of the imaging plane of the image sensor, and
wherein $-0.5<f/f4<-0.1$ is satisfied, where f4 is a focal length of the fourth lens, and f is an overall focal length of the optical imaging system.

2. The optical imaging system of claim 1, wherein the second lens comprises a concave image-side surface.

3. The optical imaging system of claim 1, wherein the third lens comprises a convex object-side surface and a convex image-side surface.

4. The optical imaging system of claim 1, wherein the fourth lens comprises a concave object-side surface.

5. The optical imaging system of claim 1, wherein the fifth lens comprises a convex image-side surface.

6. The optical imaging system of claim 1, wherein the sixth lens comprises a convex object-side surface and a convex image-side surface.

7. The optical imaging system of claim 1, wherein $n3<1.64$ is satisfied, where n3 is a refractive index of the third lens.

8. The optical imaging system of claim 1, wherein $n7<1.64$ is satisfied, where n7 is a refractive index of the seventh lens.

9. The optical imaging system of claim 1, wherein $n7<1.64$ is satisfied, where n7 is a refractive index of the seventh lens.

10. An optical imaging system comprising:
a first lens comprising negative refractive power;
a second lens comprising refractive power;
a third lens comprising positive refractive power;
a fourth lens comprising negative refractive power;
a fifth lens comprising refractive power;
a sixth lens comprising positive refractive power; and
a seventh lens comprising negative refractive power,
wherein the first to seventh lenses are sequentially disposed from an object side toward an image side,
wherein $-0.5<f/f4<-0.1$ is satisfied, where f4 is a focal length of the fourth lens, and f is an overall focal length of the optical imaging system, and
wherein $n3<1.64$ is satisfied, where n3 is a refractive index of the third lens.

11. The optical imaging system of claim 10, wherein the second lens comprises a concave image-side surface.

12. The optical imaging system of claim 10, wherein the third lens comprises a convex object-side surface and a convex image-side surface.

13. The optical imaging system of claim 10, wherein the fourth lens comprises a concave object-side surface.

14. The optical imaging system of claim 10, wherein the fifth lens comprises a convex image-side surface.

15. The optical imaging system of claim 10, wherein the sixth lens comprises a convex object-side surface and a convex image-side surface.

16. An optical imaging system comprising:
a first lens comprising negative refractive power;
a second lens comprising refractive power;
a third lens comprising positive refractive power;
a fourth lens comprising negative refractive power;
a fifth lens comprising refractive power and a convex image-side surface;
a sixth lens comprising positive refractive power; and
a seventh lens comprising negative refractive power,
wherein the first to seventh lenses are sequentially disposed from an object side toward an image side,
wherein $TTL/(2*IMGH)<3.0$ is satisfied, where TTL is a distance from an object-side surface of the first lens to an imaging plane of an image sensor, and IMGH is a half of a diagonal length of the imaging plane of the image sensor, and
wherein $n3<1.64$ is satisfied, where n3 is a refractive index of the third lens.

17. The optical imaging system of claim 16, wherein the second lens comprises a concave image-side surface.

18. The optical imaging system of claim 16, wherein the third lens comprises a convex object-side surface and a convex image-side surface.

19. The optical imaging system of claim 16, wherein the fourth lens comprises a concave object-side surface.

20. The optical imaging system of claim 16, wherein the sixth lens comprises a convex object-side surface and a convex image-side surface.

* * * * *